United States Patent [19]
Adams

[11] 3,804,544
[45] Apr. 16, 1974

[54] DRILL FEED CONTROL
[76] Inventor: Ralph D. Adams, 1210 Portola Ave., Escondido, Calif. 92025
[22] Filed: Dec. 29, 1971
[21] Appl. No.: 213,683

[52] U.S. Cl.................. 408/14, 408/110, 408/126, 408/132, 173/31, 173/146
[51] Int. Cl............................................ B23b 47/20
[58] Field of Search ........... 408/110, 126, 132, 129, 408/130, 112, 97, 98, 95, 14; 173/31, 146

[56] References Cited
UNITED STATES PATENTS
| | | | |
|---|---|---|---|
| 3,679,320 | 7/1972 | Bohorquez | 408/14 |
| 2,784,616 | 3/1957 | Quackenbush | 408/129 |
| 1,926,788 | 9/1933 | Park et al. | 408/110 X |

*Primary Examiner*—Gil Weidenfeld
*Attorney, Agent, or Firm*—Forrest J. Lilly

[57] ABSTRACT
Feed control comprises a frame attached to a drill motor and carrying an axially slidable guide shaft with a pressure foot at forward end to contact a work piece to be drilled. A lead screw is carried by the frame and rotatable about an axis parallel to the axis of the drill motor and drill bit. A nut member carried by the guide shaft engages the lead screw and prevents retraction of the guide shaft and relative advance of drill bit toward and into the work piece when axial force is applied. A drive train connected to the lead screw and the drive shaft rotates the former when the latter is rotated, and enables the nut member to "back off" along the lead screw so that the guide shaft retracts gradually at a predetermined rate and the bit advances at a corresponding rate. Since the bit cannot advance freely and independently, it cannot surge or jam when it breaks through the rear of the work piece. In preferred form, a clutch is provided in the drive train and actuated by load on pressure foot, which prevents backing off when not actually drilling. Device works in same way when applied to drill press or power feed machines mounted on fixtures or work pieces.

23 Claims, 7 Drawing Figures

PATENTED APR 16 1974

DRILL FEED CONTROL

BACKGROUND OF THE INVENTION

This invention lies in the field of controls for the rate of advance or feed of drills into work pieces, and is directed particularly to apparatus which prevents the feeding of drills at excessive rates and also prevents surging or jamming of drills as they break through the rear faces of work pieces.

It is well known that there are optimum rates of axial feeds of drills for various sizes and rotational speeds and for various materials. When drills are used in continual production work it is normal to select the proper tip shape and rotational speed for a given size bit working in a given material in order to drill cleanly and rapidly with minimum dulling of the cutting edges. However, in the case of hand held drills and manually controlled drill presses, the amount of axial force applied and the rate of feed of the drill bit into the work are actually determined by the experience and judgment of the individual operator. This is not a simple matter, and the results vary widely.

In addition, a great deal of such work is performed on work pieces comprising one or more sheets of relatively thin metal, particularly in the aerospace industry. Such sheets are somewhat elastic and normally are not supported immediately adjacent to the point of drilling, with the result that they are elastically displaced by the drill pressure. When the drill breaks through the rear, the sheets spring back elastically and may jam or break the drill as well as produce burrs. Another problem with drilling multiple layers is that when the drill breaks through one layer or sheet, that sheet frequently springs away from the next one and leaves a gap in which burrs may lodge, usually with no possibility of removing them.

The same general problems are encountered with manually controlled or operated drill presses because the basic operation is the same with the press stand supporting the drill for the man. In either case the drilling operation is slowed down because the man starts to automatically hold back as he feels that he is approaching the end of the cut in order to avoid surge, jamming, or breaking of the drill.

Power feed drilling machines also have these problems because basically they are merely substituting external power for manpower and have no means for sensing the final stage of the cut.

SUMMARY OF THE INVENTION

The present invention overcomes the difficulties mentioned above and offers a device which is simple in construction and operation as it acts to positively limit the maximum rate of axial feed to a predetermined amount and requires maintenance of adequate pressure on the work piece during the drilling operation.

Generally stated, in preferred form, the basic unit includes a frame which is attached to the drill motor and which carries a guide shaft which is slidably mounted for axial movement parallel to the axis of the drill motor or drill bit in advancing and retracting directions with respect to the bit. In a first form, the aft portion of the shaft is slidable on the frame and the forward free end portion extends beyond the frame and carries a pressure foot which has a pressure pad for engaging the work piece adjacent to the point of drilling. Restraining means is built into the frame and includes a lead screw mounted for rotation about its axis parallel to the drill axis and with only slight axial movement, and a nut member carried by the guide shaft and engaging the threads on the lead screw. Ordinarily the guide shaft is initially adjusted to such a forward or advanced position that when the pressure foot is in contact with the work piece the tip of the drill bit is just in contact or slightly spaced rearward. Pressure applied to the drill motor and thence to the pressure foot results in back pressure on the guide shaft which is positively opposed by the restraining means, and the drill cannot penetrate the work piece.

A drive train, preferably a plurality of reduction gears, is connected between the drill motor drive shaft and the lead screw so that when the drive shaft is rotated the lead screw is also rotated at a predetermined lower rate. The nut member "backs off" on the lead screw and allows the guide shaft to retract, in effect advancing the drill bit to or through the work piece. The rate of feed is predetermined by the gear reduction and cannot be exceeded regardless of the axial pressure on the drill motor or drive shaft. Since the pressure is always directly applied to the first surface of the work piece there is no spring-back or surge when the drill tip reaches the last surface and there is no inter-laminar gap to receive burrs.

The thread form on the lead screw is basically a buttress thread arranged with its high angle face opposing the thrust of the nut member. The latter is resiliently biased into engagement and is readily displaced laterally against the bias by the low angle faces so that the guide shaft and nut member may be advanced rapidly for a new drilling operation.

If the drill motor is actuated only when the pressure foot is in firm contact with the work piece, the lead screw may be positively connected with the drive shaft. However, if it is actuated without drilling, the lead screw will be rotated and will build up slack so that the guide shaft may retract and not perform its function. Hence, in the preferred form, a normally disengaged clutch is incorporated in the end of the drive train adjacent to the lead screw, which is mounted for a small amount of axial movement. If no drilling is being done, actuation of the drill motor will not actuate the lead screw. However, when the pressure foot is in contact with the work piece and adequate pressure is applied, the guide shaft, nut member, and lead screw are retracted enough to cause the clutch members to engage and operate the lead screw to produce the proper feed rate. A spring is preferably incorporated to maintain the clutch members disengaged in the absence of drilling pressure.

The same construction can be applied to power feed machines mounted on drilling fixtures or clamped to work pieces and will operate in the same way.

The same construction may also be used with conventional stationary drill presses. However, a desirable modification in this case comprises extending the guide shaft aft instead of forward and providing a contact member on the guide shaft to engage an ear on the spindle housing which will serve as a reference member instead of the first surface of the work piece since it is at a constant distance from the latter.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENTS

Figure 1:
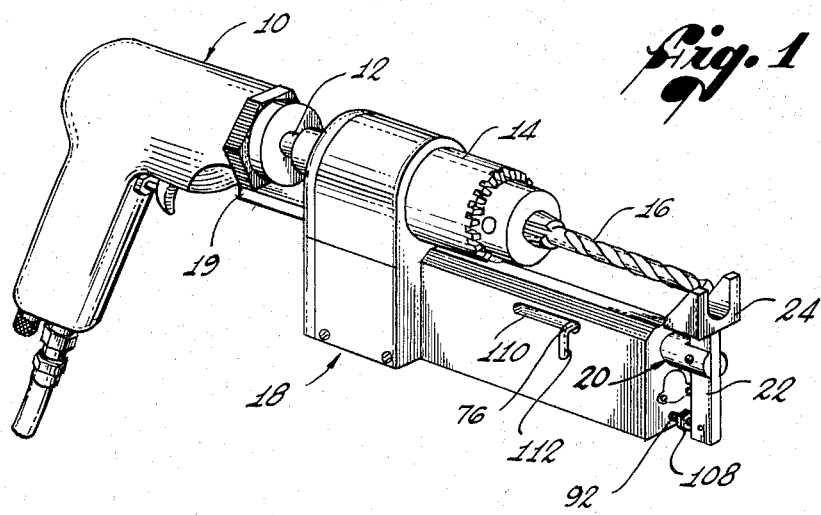
FIG. 1 is a schematic view in perspective of a typical hand held drill motor with the feed control of the invention attached thereto.

The general arrangement illustrated in FIG. 1 shows a typical electric or air operated drill motor 10 having a drive shaft 12 and a standard chuck 14 mounting a drill bit 16. A frame 18 secured to motor 10 by bracket 19 is preferably a casing to enclose various components and carries an extension drive shaft 28, (FIG. 2), which is interposed between drive shaft 12 and chuck 14. A guide shaft 20 is slidably mounted in the forward part of the frame and is fixedly connected at its forward end to pressure foot 22 having at one end a pressure pad 24 to engage a work piece adjacent to the point of drilling. The pressure pad is shown as a yoke but it may be an annulus, and in some cases may be provided with a drill bushing.

Figure 2:
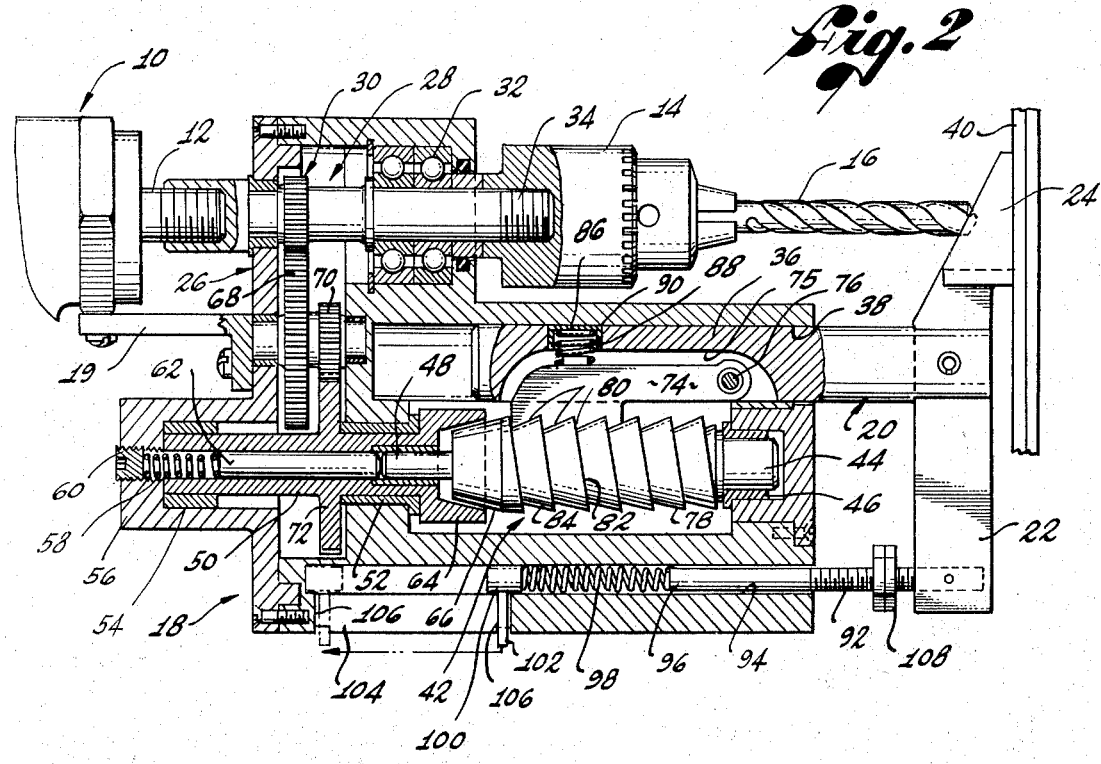
FIG. 2 is a schematic side elevational view, partly in section, of the basic arrangement of the components.

As illustrated in FIG. 2, the frame 18 may comprise a casing 26 made up of a plurality of separable parts, not indicated, for proper assembly and support of various components. The upper part of the casing encloses an extension drive shaft 28 having an integral drive pinion 30. The aft end of the shaft is connected to the motor shaft 12 and the forward portion passes through a double row ball bearing 32 mounted in the casing or frame, the forward end 34 extending out of the casing to receive chuck 14.

The aft portion 36 of guide shaft 20 is axially slidably mounted in a passage 38 of the frame for advancing and retracting movement with respect to drill bit 16 in a path parallel to the axes of the drill motor and the bit, and pressure pad 24 is located to contact the first surface of the work piece 40 adjacent to the point of drilling. The work piece may be one or more pieces of thick or thin material.

A lead screw 42, rotatable about its own axis parallel to the axis of the drill motor, has a forward shank 44 mounted in bearing 46 and an aft shank 48 rotatably mounted in sleeve 50, which in turn is mounted in thrust bearing 52 and in bushing 54 carried by boss 56. A spring 58 in the aft end of the sleeve, backed up by set screw 60, presses against a shaft 62 which constantly urges the lead screw forward. The forward end of the sleeve carries an integral cone clutch member 64 to engage a mating clutch member 66 on the lead screw. The clutch members are normally disengaged because of the pressure of spring 58 but, when the lead screw is pushed rearward, they engage to cause the sleeve and lead screw to rotate in unison. The power for rotation is furnished by drive shaft 28 through a drive train including its drive pinion 30, intermediate driven pinion 68 and intermediate drive pinion 70, and driven pinion 72 mounted on sleeve 50. A substantial gear reduction is incorporated because the lead screw must run much slower than the drive shaft, and any number of suitably related gears may be used.

Guide shaft 20 is connected to the lead screw by means of a nut member 74 which may take any suitable form. It may be radially slidably mounted in a recess in the guide shaft but preferably an elongate relatively narrow slot is formed in the guide shaft and the nut member is in the form of an arm having its forward end mounted on pivot pin 76 extending on a lateral axis so that the aft end of the arm may swing in and out radially. The aft end is provided with a formation to engage threads 78 on the lead screw and may be a single detent but preferably is formed as shown with threads or teeth 80 matching threads 78. The threads and teeth are of a form the same as or similar to the well known buttress type.

The forward faces 82 of the lead screw threads are set at a very sharp angle just short of perpendicular while the aft faces 84 are set at a very long angle. It will be seen that a line perpendicular to forward faces 82 at their point of contact with teeth 80 will pass inside pivot pin 76, with the result that axial retracting pressure on guide shaft 20 will cause a positive non-slip engagement between threads 78 and teeth 80. On the other hand, advance movement of the guide shaft will cause teeth 80 to be cammed outward and the guide shaft is free to move forward with respect to the lead screw. The nut member is held yieldingly in engagement with the lead screw by a spring 86 mounted in a radial passage 88 and preferably provided with a cap 90 which makes frictional engagement with the passage wall to resist unintentional axial movement of the guide shaft. However, when it is desired to commence a drilling operation, the pressure foot may be gripped to pull the guide shaft in a forward, or advance, direction overcoming the friction of cap 90 and ratcheting the nut member over the threads of the lead screw.

To carry out a drilling operation, the first step is to advance the guide shaft until the contact face of the pressure pad 24 is approximately even with the point or tip of bit 16. The drill is then brought into working position and the pressure pad placed against the work piece, applying considerable axial pressure which will force the guide shaft, nut member, and lead screw aft the very short distance necessary to cause the clutch members to engage. The motor is then activated to cause the bit and the lead screw to rotate. The direction of the threads is, of course, such that the screw effectively moves into the nut member so that conversely the nut member retracts and enables the guide shaft and pressure foot to gradually retract while the drill bit advances relatively to penetrate the work piece.

The bit cannot advance unless the pressure foot retracts, and this requires adequate axial drilling pressure. The gear reduction and the pitch of the lead screw are chosen to accomplish the desired feed rate, which is a maximum limitation rather than a minimum. The operator cannot move the bit into the work piece any faster no matter how much force he applies. There can be no spring back when the tip of the drill breaks through the rear of the work piece because the pressure is being exerted by the pressure foot which holds the work piece immobile. Thus, surge, jamming, and drill breakage are prevented. Hence the operator is relieved of the necessity of trying to hold back just before he thinks that the drill is about to break through. Furthermore, if the work piece comprises two layers, as shown, or more and particularly if they are relatively thin and somewhat elastic, each layer tends to spring back and separate from the next layer when a bit without the present device penetrates it. This forms a gap into which burrs may be forced so that a proper riveted joint cannot be achieved. With the present invention, the axial load of the pressure foot forces the layers tightly together until the drilling is completed. This is of particular value in the field of manufacturing aircraft structures where two or more thin sheets of metal are often overlaid for drilling in place and cannot be subsequently separated to clean out burrs.

Another advantage of this construction is that the feed rate is built in and cannot be tampered with or readjusted readily by the operator. The feed rate may be changed intentionally in the tool crib for adjustment to different types of work by partial disassembly and substitution of different ratio drive trains or thread pitches. A large percentage of the drilling jobs can be done with a feed range of two to six thousandths of an inch per revolution of the drill bit, but any other desired feed rate can be provided by selecting suitable drive reduction ratios and thread pitches.

The present system differs from positive feed systems and is superior to them because it provides a restricted maximum set rate which is all that a positive feed system accomplishes and it also prevents spring back etc. as explained above, which the positive feed system does not do.

A positive feed system cannot be applied to a conventional hand held drill because there is no mounting base with a positive reference point. However, the present invention provides this feature along with all of its other advantages.

The use of the clutch members 64 and 66 as described above precludes the possibility of developing backlash and allowing the drill to proceed without restraint if the operator should fail to follow instructions. If he actuates the motor when the drill is not in working position, the clutch will be disengaged and the pressure foot will not retract. Furthermore, if the bit is partly through the work and the operator releases the pressure for any reason, the clutch will disengage, retraction will cease, and no backlash will develop which could unduly advance the bit.

When a large number of identical holes are to be drilled on a production basis it is desirable to provide a rapid advance of the pressure foot after each operation. For this purpose a return shaft 92 is fixedly connected at its forward end to pressure foot 22 and its aft portion slides axially in passage 94. Its aft end 96 is engaged by return spring 98 backed up by abutment 100. The spring pressure is selected to be high enough to overcome the camming force of teeth 80 on threads 78 and the friction force of cap 90 so that it will automatically advance the pressure foot when axial pressure against the work piece is removed.

In situations where very small bits are used to drill deep holes it is common to back the bit out of the hole one or more times to clear the chips. When this is done with the present device in use, it is desirable to retain the pressure foot adjustment rather than using the automatic advance so that the bit may be immediately returned to its cutting position. This is done by making the abutment axially movable between a forward position as shown in solid lines where the spring is compressed to an aft position shown in broken lines where the spring is unloaded. The abutment is provided with an operating pin 102 which travels in slot 104 and is swung laterally to engage in one of the bayonet recesses 106.

A special combined drill and conical reamer is frequently used to drill a hole in a work piece and then produce a countersink for reception of a flat head fastener. The depth of the countersink must be very accurately controlled, and usually an elaborate stop mechanism is used for this single purpose. In the present device the same result is achieved by providing threads on return shaft 92 and mounting a threaded stop control member 108 on the shaft. This can be very accurately adjusted to give any desired depth of hole or countersink.

While the guide shaft and pressure foot may be readily advanced by pulling on the pressure foot or by the use of the return shaft and spring 92 and 98, it is sometimes necessary or desirable to retract the guide shaft. To accomplish this, nut member 74 may be fixedly connected to pivot pin 76 which is then rotatable in the guide shaft. One end of the pin is then extended laterally out of the frame or casing 18 through slot 110 and provided with a handle 112 as seen in FIG. 1. The handle is turned to raise teeth 80 out of engagement with threads 78 and the guide shaft may then be retracted.

Figure 3:
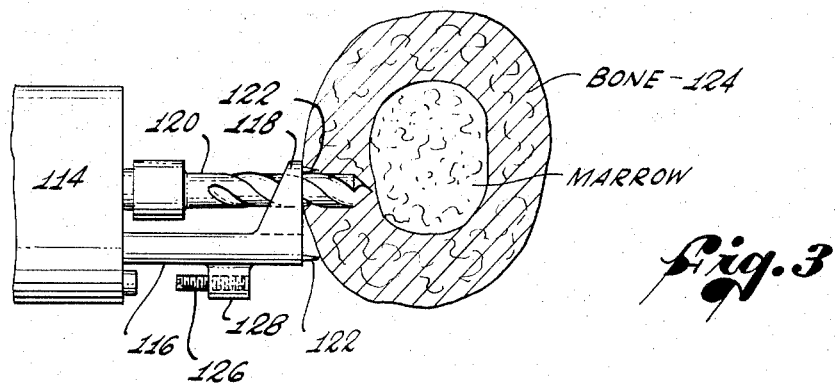
FIG. 3 is a schematic partial side elevational view of a modification.

The present invention is extremely valuable for use in medical work such as bone drilling. Bones have hard and soft spots and it is very difficult to control the drill feed which is critical to avoid damage to the bone structure. As schematically shown in FIG. 3, the same type of device as described above is applied on a small scale to a specialized bone drill. Casing 114 contains the control components and guide shaft 116 is basically the same as member 20. The pressure pad 118 is preferably annular to surround bit 120 and is provided with a plurality of sharp prongs 122 spaced around the margin and extending outward so that one or more of them will penetratingly engage the relatively soft bone work piece 124 and prevent lateral slippage of the pressure pad and the bit. An adjustable stop screw 126 mounted in a boss 128 to engage the casing controls the depth of penetration.

Figure 4:
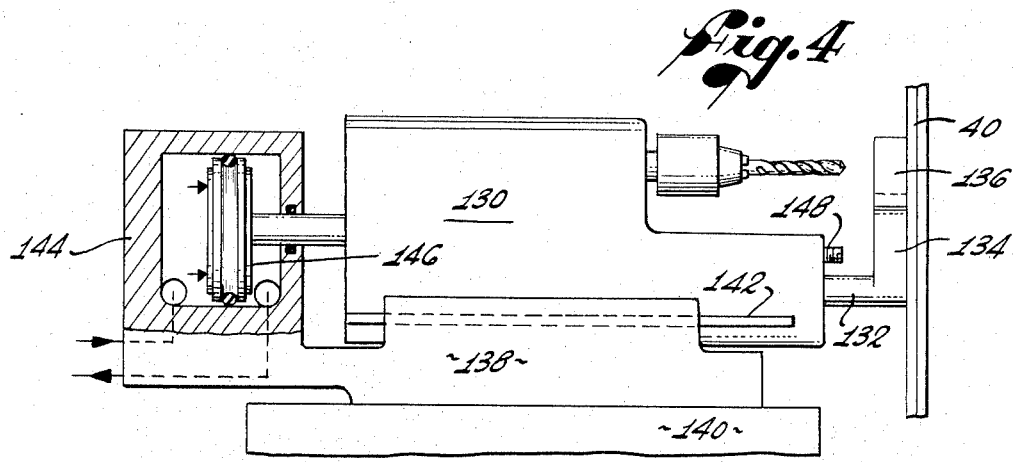
FIG. 4 is a schematic side elevational view of the device applied to a power feed drilling machine mounted on a drilling fixture.

The invention may be applied to power feed machines, pneumatically or hydraulically driven, in the same manner as to hand held drills. In FIG. 4, the casing 130 is comparable to casing 18 and contains the control components. Guide shaft 132 carries pressure foot 134 with its pressure pad 136 to engage work piece 40. A mounting base 138, adapted to be secured to a drilling fixture 140, is provided with spaced slide guides to receive slides 142 on the sides of the casing. Feed cylinder 144, connected to base 138, is supplied with pressure fluid to force piston 146 and casing 130 toward the work piece. The control operation is exactly the same as above described. An adjustable stop screw 148, carried by the casing, contacts the pressure foot to control the depth of penetration.

Figure 5:
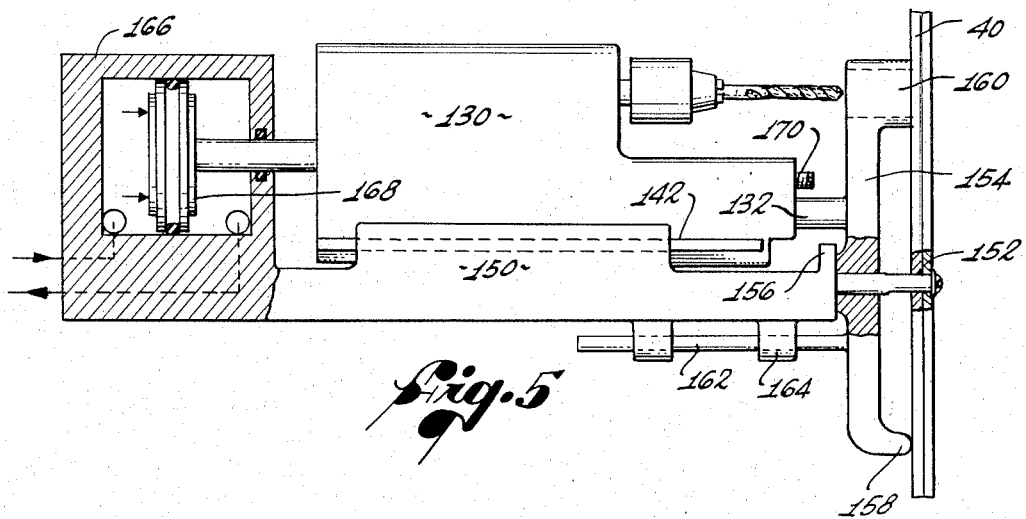
FIG. 5 is a view similar to FIG. 4 with the drilling machine clamped to a work piece.

In FIG. 5, the mounting base 150 is adapted to be connected to the structure to be drilled. For this purpose it is provided with a clamping pin or collet 152 which passes through the work piece 40 and pressure foot 154 and into boss or flange 156 on the base to pull the latter against the pressure foot which in turn is pulled against the work piece, engaging boss 158 and pressure pad 160. A guide rod 162 on the pressure foot passes through ears 164 on the mounting base. Feed cylinder 166, connected to base 150, is supplied with pressure fluid to force piston 168 and casing 130 toward the work piece. Adjustable stop screw 170 is carried by the casing.

Figure 6:
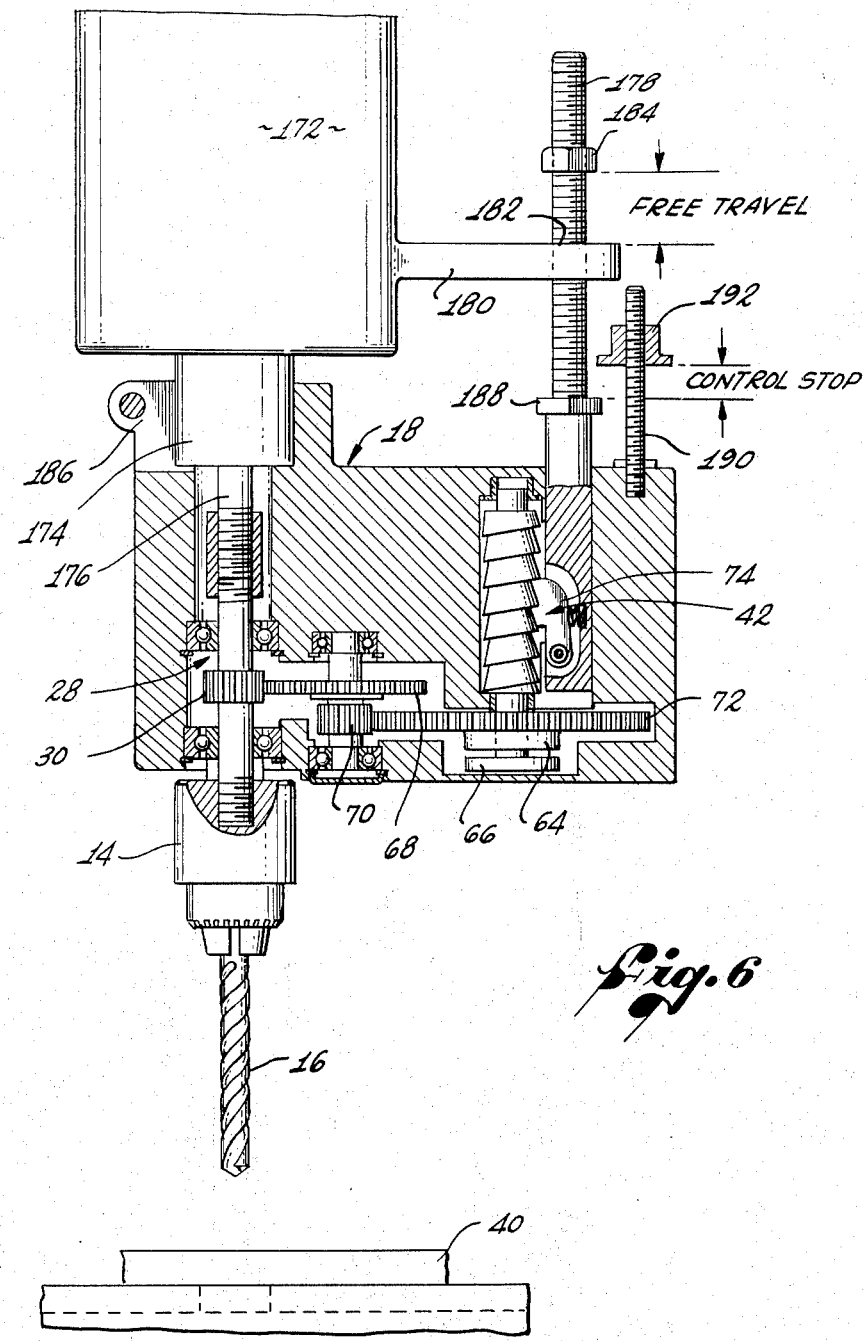
FIG. 6 is a view of a stationary drill press equipped with another modified form of the invention.

A stationary drill press may be equipped with exactly the same device as a hand held drill and will operate in the same way. However, the modification shown in FIG. 6 is possible because the drill structure can furnish a reference member instead of using the work piece. In this Figure, the stationary spindle housing 172 carries a vertically slidable spindle guide 174 which may be raised and lowered in conventional manner by a handle, not shown. Drive shaft 176 is rotatably mounted in the spindle guide and is connected to the extension drive shaft 28 which drives the drill bit and the drive train. Frame 18 is connected to the spindle guide by clamp 186. Guide shaft 178 extends rearward from frame 18 instead of forward but is connected to nut member 74 in the same way as previously described and is controlled in the same way.

The fixed reference member is arm 180 rigidly connected to the spindle housing and extending laterally, with its upper surface 182 defining the reference plane. The guide shaft extends upward through or beside the arm and is provided with an adjustable contact member 184 adapted to engage surface 182. The space between the contact member and surface 182 is the free travel of the drill and is so adjusted that when member 184 engages surface 182 the drill tip will be just short of the work piece. When substantial downward axial pressure is now applied to the spindle guide, clutch members 64 and 66 will engage and the drill will be permitted to gradually advance into the work piece.

To control the depth of penetration, an abutment 188 is provided on the second end portion of the guide shaft. A threaded rod 190 is mounted on the frame and carries a threaded stop member 192 which may be adjusted to the material thickness or to the depth of a hole or countersink. When the stop member contacts the abutment, the frame cannot be lowered farther.

This form of the invention may be used with a drill press because the work piece is supported by a solid backing and ordinarily is rather heavy stock so that the spring back problem is not encountered. However, the drill press still has the surge problem and the problem of controlled penetration, both of which are eliminated by the use of this invention.

The feed control described above serves to limit the maximum rate of advance of a drill bit but not the minimum rate. Hence it differs from the positive feed type which forces a drill bit to advance regardless of the nature of a particular work piece. The clutch faces of the present device are preferably metallic, such as bronze against steel, and some slippage occurs when pressures are low. The operator may apply just enough pressure to cause the feed screw to rotate slowly and produce a feed rate of the order of 0.001 inch per revolution of the bit, or any greater pressure up to that which permits no slippage and the maximum feed rate determined by the gear ratio of the drive train. It has been found that feed rates controlled by selected pressures produce superior holes and greatly improve cutting tool life.

The detent means 74, 80 has been shown and described simply as a nut member for simplicity of illustration. However, it will be apparent that it may take various other forms such as a split nut or a slider with a ratcheting tooth. In cases where loads are high, as in power feeds, the lead screw may take the form of a sleeve with internal threads and the detent means may be an elongate shaft with a plurality of threaded segments resiliently biased radially outward to engage the threads of the sleeve and act in the same way as the exemplary form shown in the drawings.

Figure 7:
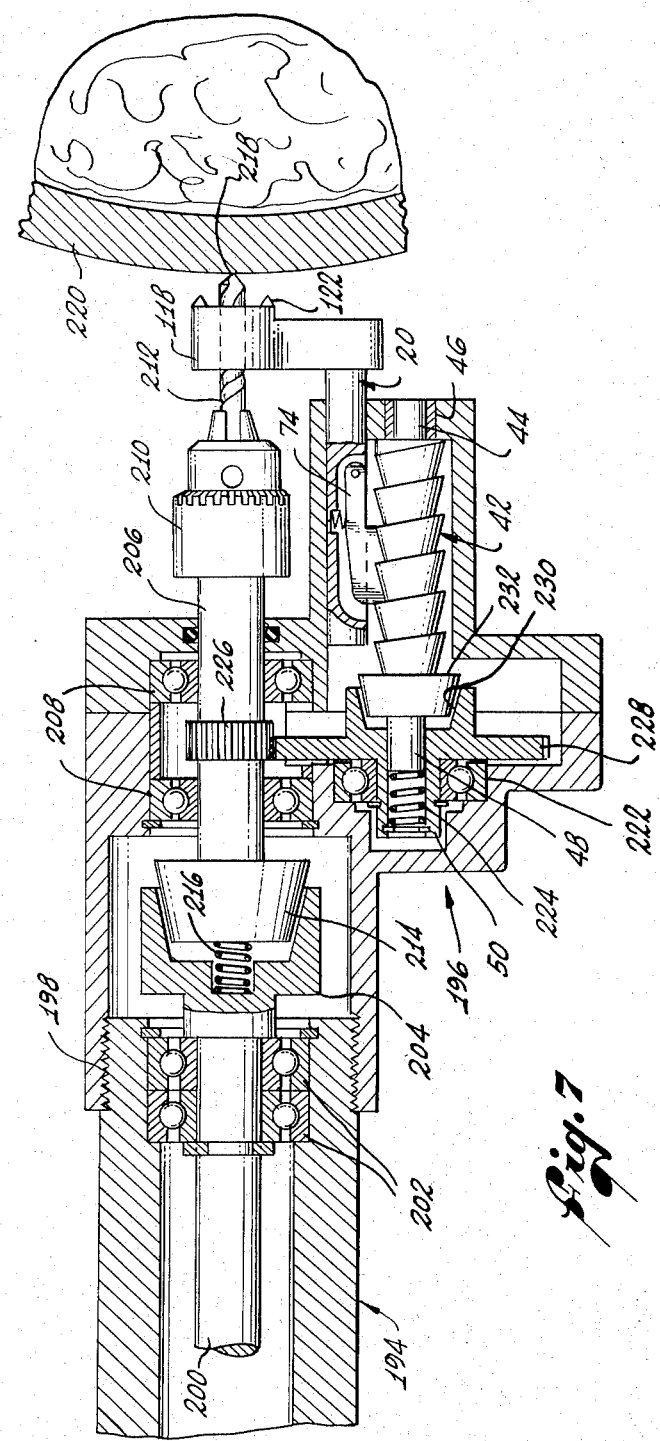
FIG. 7 is a schematic side elevational view, partly in section, of a modified form of the device of FIG. 3.

A further modification of the devices of FIGS. 2 and 3 is schematically illustrated in FIG. 7. This form is particularly useful for surgical work and provides positive control of the entire drill unit to insure drilling holes in the human skull without danger of damaging the brain by surging of the drill point after breakthrough. Drill motor 194 may be of any suitable type, and frame 196 may be attached to it by a screw thread connection 198 as shown. The forward end of drive spindle 200 is mounted in bearing 202 and is provided with the element 204 of a cone type clutch.

Drive shaft 206 is slidably mounted in bearings 208 and has a conventional chuck 210 at its forward end to grip the drill bit 212. At its aft end, it carries the other element 214 of the cone type clutch, and the shaft is biased forward by spring 216 located between the elements. It will be apparent that the spring may be located at any point where it will perform the desired function. If the motor is activated without pressure on the drill, the spindle will rotate freely but will not rotate the drive shaft. However, when the point 218 of the drill bit contacts the work piece 220, which is a human skull, the axial pressure will retract the drive shaft and cause engagement of the clutch elements, resulting in rotation of the bit. When the bit breaks through the rear surface of the skull, the axial pressure drops off and may even become tension because of the advancing of the drill flutes. The clutch elements immediately disengage and drill rotation ceases. However, with no further preventive action, the drill may be pushed forward without rotation and cause serious damage to the brain.

This danger is overcome by provision of the feed control including guide shaft 20, detent means 74, and lead screw 42. The latter is provided as before with a forward shank 44 mounted in bearing 46 and an aft shank 48 mounted in sleeve 50 which in turn is mounted in a bearing 222. Spring 224 presses against the aft end of shank 48 to urge the lead screw forward. Drive shaft 206 carries a fixedly mounted drive gear 226 which engages driven gear 228 fixed to sleeve 50 which also carries a clutch element 230 to engage clutch element 232 secured to the aft end of the lead screw.

In the operation of this modification, the pressure foot is adjusted so that when point 218 just engages the skull the prongs 122 will be slightly spaced, preferably even less than indicated in the drawing. As soon as the drill begins to penetrate, one or more prongs 122 will engage and cause retraction of guide shaft 20 and lead screw 42. This engages clutch members 230 and 232 to activate the lead screw and gradually retract the pressure foot 118 with respect to the frame. Drilling continues until point 218 breaks through the inner wall. At this point, the axial pressure on the drill drops off and clutch members 204 and 214 disengage, stopping the drill immediately. Since the lead screw is controlled by the drive shaft through gears 226 and 228, it also stops immediately and prevents any inward movement of the drill, thus avoiding any possibility of damage to the brain. It will be noted that if the lead screw were controlled by spindle 200 instead of by shaft 206 it would continue to feed the drill forward with resulting damage even though the drill would not be rotating. Consequently, it will be seen that the combination described provides total protection for delicate surgical procedures.

The form of FIG. 7 also has applications to some manufacturing operations. In cases where a built-up structure has two elements which are closely spaced depthwise and it is necessary to drill a hole in one element without cutting or scratching the other, the feed control will operate in the same way as just described and provide complete protection for the second element.

I claim:

1. A feed control for use in combination with a drill motor having a drill shaft driving a drill bit, comprising:

a frame having means for attachment to the drill motor;
a guide shaft having an aft portion axially slidably mounted on the frame for axial extension and retraction parallel to the axis of the drill motor;
a pressure foot fixedly mounted on the forward free end of the guide shaft and having a pressure pad to pressurally engage a work piece adjacent to the point of engagement of the drill bit;
and restraining means to positively oppose retraction of the guide shaft under axial pressure,
the restraining means being controlled in position by the rotation of the drill motor drive shaft to enable the guide shaft and foot to gradually retract with respect to the frame in response to axial pressure between the foot and the work piece and produce a corresponding advance of the drill bit with respect to the pressure foot.

2. A feed control as claimed in claim 1;
the restraining means including a resiliently biased releasable detent connection to permit rapid extension of the guide shaft.

3. A feed control as claimed in claim 1;
and adjustable stop means to limit retraction of the guide shaft and pressure foot to a predetermined extent and consequently limit the penetration of the drill bit into the work piece.

4. A feed control for use in combination with a drill motor having a drive shaft driving drill bit, comprising;

a frame having means for attachment to the drill motor;
a guide shaft having an aft portion axially slidably mounted on the frame for extension and retraction movement parallel to the axis of the drill motor;
a pressure foot fixedly mounted on the forward free end of the guide shaft and having a pressure pad to pressurally engage a work piece adjacent to the point of engagement of the drill bit;
a lead screw mounted on the frame for rotation about an axis parallel to the axis of the drill motor;
drive means connected between the lead screw and the drive shaft of the drill motor to cause rotation only of the lead screw in response to the rotation of the drive shaft and axial pressure on the pressure foot;
and detent means connected to the guide shaft and engaging the threads of the lead screw to restrain retraction of the guide shaft under axial pressure;

the rotation of the lead screw enabling the detent means and the guide shaft to gradually retract with respect to the frame in response to axial pressure and effectively enable the drill bit to advance with respect to the work piece at a limited feed rate.

5. A feed control as claimed in claim 4;
the detent means being resiliently biased into engagement with the lead screw to maintain contact for application of axial pressure, and readily releasable against the biasing force in the absence of axial pressure to permit rapid extension and retraction of the guide shaft.

6. A feed control as claimed in claim 5;
the guide shaft being provided with an axially elongate radially extending cavity;
the detent means being in the form of an elongate arm located in the guide shaft cavity and being pivotally mounted at its forward end in the forward portion of the cavity and provided at its aft end with a formation for pressurally engaging the threads of the lead screw.

7. A feed control as claimed in claim 6;
the pivotal mounting of the arm comprising a pivot shaft rotatably mounted in the guide shaft on an axis perpendicular to the axis of the guide shaft;
the arm being fixedly connected to the pivot shaft for rotation therewith;
and the pivot shaft having one end extending outward of the frame and provided with a formation to be manually gripped for rotation of the pivot shaft and arm.

8. A feed control as claimed in claim 4;
and adjustable stop means interengaging between the pressure foot and the frame to positively limit the extent of retraction of the pressure foot.

9. A feed control as claimed in claim 4;
the detent means being resiliently biased into engagement with the lead screw to maintain contact for application of axial pressure, and readily releasable against the biasing force in the absence of axial retracting pressure;
and spring means operable to urge the guide shaft toward fully extended position in the absence of axial retracting pressure.

10. A feed control as claimed in claim 9;
an axial passage in the frame extending parallel to the axis of the guide shaft;
a return shaft having a forward end connected to the pressure foot and an aft portion slidably extending into the passage;
and a return spring mounted in the passage and contacting the aft end of the return shaft to urge it forward and move the guide shaft and pressure foot toward extended position.

11. A feed control as claimed in claim 10;
and an abutment axially movable in the passage to a forward position engaging the aft end of the spring to place it under compression and to an aft position to unload the spring.

12. A feed control as claimed in claim 10;

the return shaft being threaded;
and a stop member threaded on the return shaft and axially adjustable to predetermined positions to engage the frame and limit the retraction of the pressure foot.

13. A feed control as claimed in claim 4;
a spring-loaded shoe on the guide shaft frictionally engaging the frame to prevent unintentional axial movement of the guide shaft in the absence of axial pressure on the work piece.

14. A feed control as claimed in claim 4;
the drive means and the lead screw being provided with normally spaced, relatively axially movable, cooperating clutch members;
the lead screw being axially movable to a limited extent with the guide shaft and nut member in response to axial retraction pressure from engagement with the work piece to engage the clutch members and cause rotation of the lead screw in response to rotation of the drill motor drive shaft.

15. A feed control as claimed in claim 14;
and spring means operative to urge the lead screw axially to a position to disengage the clutch members when axial pressure on the work piece is released.

16. A feed control as claimed in claim 4;
the drive means including a plurality of interengaging driving and driven gears;
an extension shaft mounted at its aft end on the drill motor drive shaft and carrying a drill bit chuck at its forward end;
and the first driving gear of the drive means being fixedly mounted on the extension shaft for rotation therewith.

17. A feed control as claimed in claim 4;
the pressure pad being provided with a plurality of spaced sharp prongs extending from its work face to penetratingly engage a soft work piece and prevent lateral slippage.

18. A feed control as claimed in claim 4;
further including a supporting base adapted to be mounted on a work holding fixture;
the frame and an attached drill motor being slidably mounted on the base for axial movement toward and away from a work piece to be drilled;
and fluid power means to yieldably force the frame and drill motor toward the work piece.

19. A feed control as claimed in claim 4;
further including a supporting base provided with clamping means for rigidly connecting it to a work piece assembly;
the frame and an attached drill motor being slidably mounted on the base for axial movement toward and away from the assembly;
and fluid power means to yieldably force the frame and drill motor toward the assembly.

20. A feed control for use in combination with a drill motor having a drive spindle, an axially movable drive shaft for driving a drill bit, and clutch means between the drive spindle and drive shaft engageable by relative retraction of the drive shaft, comprising:
a frame having means for attachment to the drill motor;
a guide shaft having an aft portion slidably mounted on the frame for axial extension and retraction parallel to the axis of the drive shaft;
a pressure foot fixedly mounted on the forward free end of the guide shaft and having a pressure pad to pressurally engage a work piece adjacent to the point of engagement of the drill bit;
and restraining means to positively oppose retraction of the guide shaft under axial pressure;
the restraining means being controlled in position by the rotation of the drive shaft to enable the guide shaft and foot to gradually retract with respect to the frame in response to axial pressure between the foot and the work piece and produce a corresponding advance of the drill bit with respect to the pressure foot;
the drive shaft being driven by the drive spindle only through engagement of the clutch means in response to retraction of the drive shaft under axial pressure;
the clutch means being releasable in response to cessation of such axial pressure to discontinue both rotation of the drive shaft and drill bit and retraction of the pressure foot.

21. A feed control as claimed in claim 20;
and spring means arranged to bias the clutch means to normally disengaged condition.

22. A feed control as claimed in claim 20;
the restraining means including second clutch means biased to normally disengaged condition to immobilize the restraining means and engageable in response to axial pressure on the pressure foot to activate the restraining means for retraction of the guide shaft.

23. A feed control for use in combination with a drill motor having a drive shaft driving a drill bit, comprising:
a frame having means for attachment to the drill motor;
a guide shaft having an aft portion axially slidably mounted on the frame for axial extension and retraction parallel to the axis of the drill motor;
a pressure foot fixedly mounted on the forward free end of the guide shaft and having a pressure pad to pressurally engage a work piece adjacent to the point of engagement of the drill bit;
and restraining means to positively oppose retraction of the guide shaft under axial pressure,
the restraining means being controlled in position in a timed relation with the rate of rotation of the drill motor shaft to enable the guide shaft and foot to gradually retract with respect to the frame in response to axial pressure between the foot and the work piece and produce a corresponding advance of the drill bit with respect to the pressure foot.

* * * * *